(12) United States Patent
Grant et al.

(10) Patent No.: US 9,703,615 B2
(45) Date of Patent: Jul. 11, 2017

(54) STEPPED SIZING OF CODE EXECUTION

(71) Applicant: Facebook, Inc., Menlo Park, CA (US)

(72) Inventors: Ari Alexander Grant, San Francisco, CA (US); Jonanthan P. Dann, Palo Alto, CA (US)

(73) Assignee: Facebook, Inc., Menlo Park, CA (US)

( * ) Notice: Subject to any disclaimer, the term of this patent is extended or adjusted under 35 U.S.C. 154(b) by 0 days.

(21) Appl. No.: 14/335,743

(22) Filed: Jul. 18, 2014

(65) Prior Publication Data

US 2016/0019068 A1     Jan. 21, 2016

(51) Int. Cl.
*G06F 9/45*     (2006.01)
*G06F 9/52*     (2006.01)
*G06F 9/44*     (2006.01)
*G06F 9/445*     (2006.01)
*G06F 3/048*     (2013.01)

(52) U.S. Cl.
CPC ........... *G06F 9/52* (2013.01); *G06F 3/048* (2013.01); *G06F 8/38* (2013.01); *G06F 8/67* (2013.01); *G06F 9/445* (2013.01)

(58) Field of Classification Search
CPC . G06F 9/445; G06F 8/67; G06F 3/048; G06F 8/38
USPC ......... 717/158; 715/788, 789, 798, 800, 801
See application file for complete search history.

(56) References Cited

U.S. PATENT DOCUMENTS

| | | | | |
|---|---|---|---|---|
| 6,341,347 B1 * | 1/2002 | Joy | ...................... | G06F 9/3851 |
| | | | | 711/E12.043 |
| 6,393,605 B1 * | 5/2002 | Loomans | ............ | G06F 9/44526 |
| | | | | 709/203 |
| 6,560,606 B1 * | 5/2003 | Young | .................... | G06F 9/4881 |
| 6,564,373 B1 * | 5/2003 | Hughes | ...................... | G06F 8/48 |
| | | | | 712/227 |
| 7,383,548 B2 * | 6/2008 | Boon | .................... | G06F 9/4881 |
| | | | | 718/100 |

(Continued)

FOREIGN PATENT DOCUMENTS

CA     EP 1715413 A1 * 10/2006 ........... G06F 9/4433

OTHER PUBLICATIONS

Gregory, Keith D., "Asynchronous Operations in Swing," Mar. 15, 2010, last retrieved from www.kdgregory.com/index.php?page=swing.async on Sep. 16, 2016.*

(Continued)

*Primary Examiner* — Wei Zhen
*Assistant Examiner* — Andrew M Lyons
(74) *Attorney, Agent, or Firm* — Baker Botts L.L.P.

(57) ABSTRACT

In one embodiment, a method includes receiving a request to execute first program code that is configured to perform a step of a computation, wherein the request includes a current state of the computation, determining whether the first program code is to be invoked based on an execution condition, when the execution condition is true, executing the first program code based on the current state of the computation, and returning a response that includes a result of executing the first program code, and when the execution condition is false, returning a response indicating that the result of the executing is invalid. The execution condition may be false when an amount of time that has passed since a previous execution of the first program code is greater than a threshold time limit.

19 Claims, 11 Drawing Sheets

(56) References Cited

U.S. PATENT DOCUMENTS

| | | | | |
|---|---|---|---|---|
| 7,444,620 B2* | 10/2008 | Marvin | ........................ | G06F 8/36 717/116 |
| 7,861,222 B2* | 12/2010 | Ramsey | .................. | G06F 8/314 717/114 |
| 7,950,026 B1* | 5/2011 | Urbach | ..................... | G09G 5/14 715/733 |
| 8,191,041 B2* | 5/2012 | Huang | ..................... | G06F 8/423 717/115 |
| 8,719,791 B1* | 5/2014 | MacPherson | ......... | G06F 9/4426 717/104 |
| 9,135,006 B1* | 9/2015 | Sha | ...................... | G06F 9/30018 |
| 9,207,986 B2* | 12/2015 | Kaldor | .................... | G06F 9/485 |
| 2006/0234548 A1* | 10/2006 | Qing | ................... | G06F 9/45508 439/587 |
| 2007/0169066 A1* | 7/2007 | Nielsen | ..................... | G06F 8/38 717/162 |
| 2007/0226722 A1* | 9/2007 | Chou | .................. | G06F 9/44536 717/158 |
| 2009/0171920 A1* | 7/2009 | Wade | ................ | G06F 17/30864 |
| 2010/0322220 A1* | 12/2010 | Brown | ................ | H04W 74/002 370/338 |
| 2011/0093154 A1* | 4/2011 | Moinzadeh | ............. | B60R 25/00 701/31.4 |
| 2011/0321051 A1* | 12/2011 | Rastogi | ................. | G06F 9/4881 718/102 |
| 2013/0074080 A1* | 3/2013 | Jimenez | ................ | G06F 9/4825 718/102 |
| 2014/0317607 A1* | 10/2014 | Adi-Tabatabai | ........ | G06F 8/443 717/146 |
| 2014/0331201 A1* | 11/2014 | Adl-Tabatabai | ........ | G06F 8/443 717/106 |
| 2015/0058825 A1* | 2/2015 | Madampath | ........ | G06F 11/3636 717/128 |
| 2015/0160931 A1* | 6/2015 | Glazer | .................. | G06F 9/4445 717/109 |

OTHER PUBLICATIONS

Stack Overflow, "I need to stop execution during recursive algorithm," Mar. 27, 2010, last retrieved from http://stackoverflow.com/questions/2529496/o-need-to-stop-execution-during-recursive-algorithm on Sep. 16, 2016.*

Wysota, Witold, Qt Quarterly, "Keeping the GUI Responsive," 2009, last retrieved from https://doc.qt.io/archives/qq/qq27-responsive-guis.html on Sep. 16, 2016.*

Kerens, Guy, "Multi-Threaded Programming With POSIX Threads," Feb. 1, 2001, last retrieved from www.cs.kent.edu/~ruttan/sysprog/lectures/multi-thread/multi-thread.html on Mar. 2, 2017.*

Stack Overflow, "Waiting for a long process and still updating UI," Nov. 16, 2011, last retrieved from http://stackoverflow.com/questions/8157426/waiting-for-a-long-process-and-still-updating-ui on Mar. 2, 2017.*

* cited by examiner

STEPPED SIZING OF CODE EXECUTION

TECHNICAL FIELD

This disclosure generally relates to computer programs and to techniques for modifying computer programs to relinquish control of the processor between steps of a computation so that other program code may execute.

BACKGROUND

A social-networking system, which may include a social-networking website, may enable its users (such as persons or organizations) to interact with it and with each other through it. The social-networking system may, with input from a user, create and store in the social-networking system a user profile associated with the user. The user profile may include demographic information, communication-channel information, and information on personal interests of the user. The social-networking system may also, with input from a user, create and store a record of relationships of the user with other users of the social-networking system, as well as provide services (e.g., wall posts, photo-sharing, event organization, messaging, games, or advertisements) to facilitate social interaction between or among users.

The social-networking system may send over one or more networks content or messages related to its services to a mobile or other computing device of a user. A user may also install software applications on a mobile or other computing device of the user for accessing a user profile of the user and other data within the social-networking system. The social-networking system may generate a personalized set of content objects to display to a user, such as a newsfeed of aggregated stories of other users connected to the user.

SUMMARY OF PARTICULAR EMBODIMENTS

In particular embodiments, a first computation may be split into steps and temporarily stopped at a point between steps to allow other computations to use the same processor or thread as the first computation. The computation may be invoked again, using the same thread or processor, to continue execution at the point where it stopped. The computation may be invoked repeatedly in this way until it is complete. This stopping and starting may be done by inserting intermediary program code between the computation's program code and another computation's program code, e.g., a framework or library that invokes the computation to perform application-specific processing. Splitting a computation in this way may be used, for example, to prevent the computation from controlling the processor or thread for more time than can be tolerated by other operations, such as user interface updates, that use the same thread. The time needed for the application code's computation is therefore amortized over multiple calls to the application code, with each individual call being completed within a time limit.

In particular embodiments, application program code that performs a first computation may be augmented with intermediary program code that is interposed between the application program code and the program code of the other computation (e.g., a framework), which invokes the application program code. In this way, the intermediary program code is invoked instead of the application program code, and the intermediary program code invokes the application program code when a specified condition is met. That is, the intermediary program code yields control of the processor or thread of execution in which it is executing when the specified condition is met, so that other program code may use the processor or thread without waiting for the entire computation to be completed. The condition may be checked by the intermediary program code between steps of the computation. Steps may be defined differently for different applications. A step may be, for example, one iteration of a loop, a computation of a value based on one element of a data structure, and so on. If the condition is met, e.g., true, then the application program code is invoked. If the condition is not met, e.g., false, then the intermediary program code returns control of execution to the invoking (e.g., framework) program code, and awaits another invocation, at which point the condition is again checked and the application program code is invoked if the condition is true. The condition may be a time limit for each invocation of the application program code, in which case a timer is initially set to zero. The intermediary program code invokes the application program code while the time limit has not been reached. When the time limit is reached, the intermediary program code resets the timer, returns, and awaits another invocation.

The embodiments disclosed above are only examples, and the scope of this disclosure is not limited to them. Particular embodiments may include all, some, or none of the components, elements, features, functions, operations, or steps of the embodiments disclosed above.

DESCRIPTION OF EXAMPLE EMBODIMENTS

Figure 1:
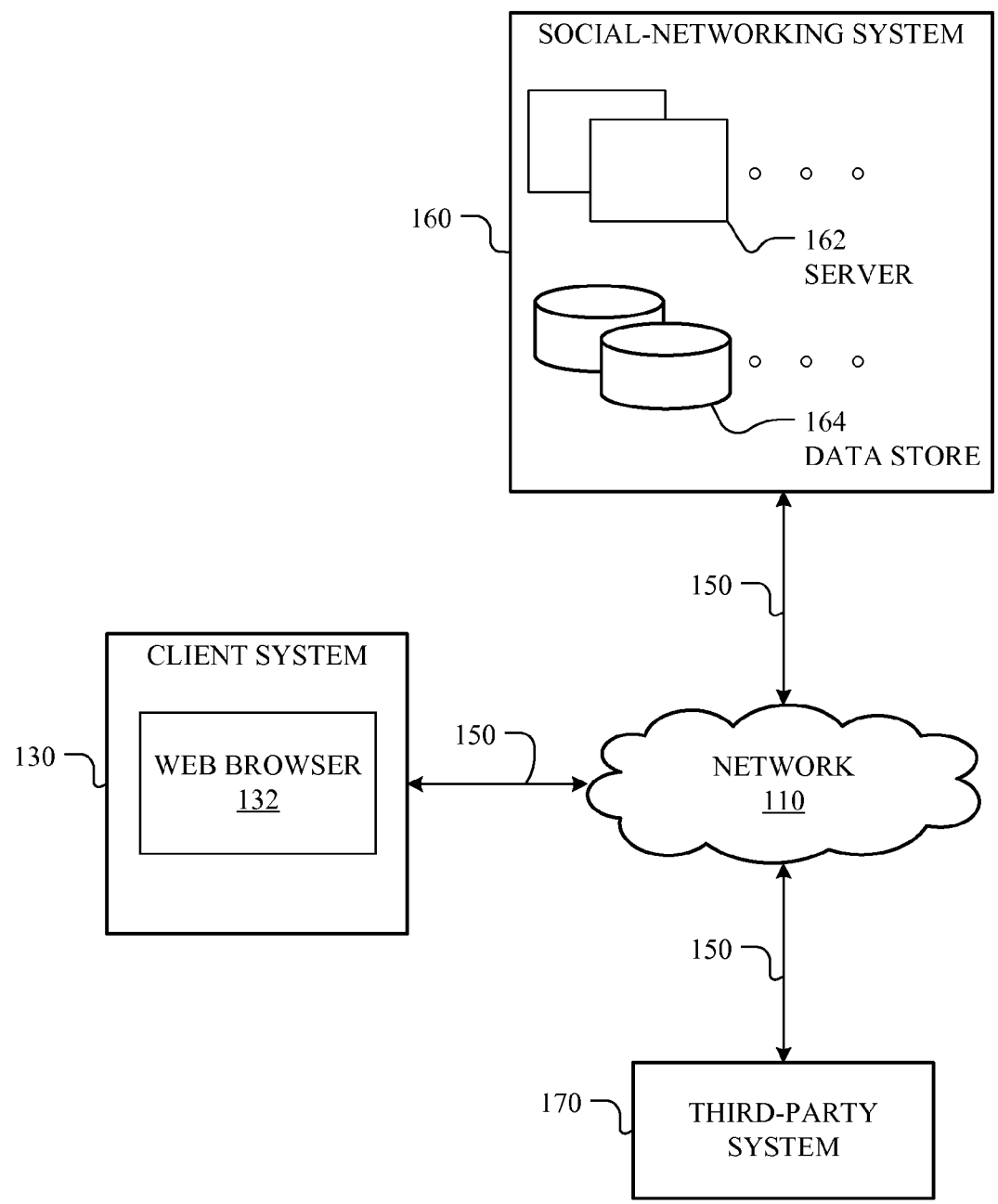
FIG. 1 illustrates an example network environment associated with a social-networking system.

FIG. 1 illustrates an example network environment 100 associated with a social-networking system. Network environment 100 includes a client system 130, a social-networking system 160, and a third-party system 170 connected to each other by a network 110. Although FIG. 1 illustrates a particular arrangement of client system 130, social-networking system 160, third-party system 170, and network 110, this disclosure contemplates any suitable arrangement of client system 130, social-networking system 160, third-party system 170, and network 110. As an example and not by way of limitation, two or more of client system 130, social-networking system 160, and third-party system 170 may be connected to each other directly, bypassing network 110. As another example, two or more of client system 130, social-networking system 160, and third-party system 170 may be physically or logically co-located with each other in whole or in part. Moreover, although FIG. 1 illustrates a particular number of client systems 130, social-networking systems 160, third-party systems 170, and networks 110, this disclosure contemplates any suitable number of client systems 130, social-networking systems 160, third-party systems 170, and networks 110. As an example and not by way of limitation, network environment 100 may include multiple client system 130, social-networking systems 160, third-party systems 170, and networks 110.

This disclosure contemplates any suitable network 110. As an example and not by way of limitation, one or more portions of network 110 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. Network 110 may include one or more networks 110.

Links 150 may connect client system 130, social-networking system 160, and third-party system 170 to communication network 110 or to each other. This disclosure contemplates any suitable links 150. In particular embodiments, one or more links 150 include one or more wireline (such as for example Digital Subscriber Line (DSL) or Data Over Cable Service Interface Specification (DOCSIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links 150 each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link 150, or a combination of two or more such links 150. Links 150 need not necessarily be the same throughout network environment 100. One or more first links 150 may differ in one or more respects from one or more second links 150.

In particular embodiments, client system 130 may be an electronic device including hardware, software, or embedded logic components or a combination of two or more such components and capable of carrying out the appropriate functionalities implemented or supported by client system 130. As an example and not by way of limitation, a client system 130 may include a computer system such as a desktop computer, notebook or laptop computer, netbook, a tablet computer, e-book reader, GPS device, camera, personal digital assistant (PDA), handheld electronic device, cellular telephone, smartphone, other suitable electronic device, or any suitable combination thereof. This disclosure contemplates any suitable client systems 130. A client system 130 may enable a network user at client system 130 to access network 110. A client system 130 may enable its user to communicate with other users at other client systems 130.

In particular embodiments, client system 130 may include a web browser 132, such as MICROSOFT INTERNET EXPLORER, GOOGLE CHROME or MOZILLA FIREFOX, and may have one or more add-ons, plug-ins, or other extensions, such as TOOLBAR or YAHOO TOOLBAR. A user at client system 130 may enter a Uniform Resource Locator (URL) or other address directing the web browser 132 to a particular server (such as server 162, or a server associated with a third-party system 170), and the web browser 132 may generate a Hyper Text Transfer Protocol (HTTP) request and communicate the HTTP request to server. The server may accept the HTTP request and communicate to client system 130 one or more Hyper Text Markup Language (HTML) files responsive to the HTTP request. Client system 130 may render a webpage based on the HTML files from the server for presentation to the user. This disclosure contemplates any suitable webpage files. As an example and not by way of limitation, webpages may render from HTML files, Extensible Hyper Text Markup Language (XHTML) files, or Extensible Markup Language (XML) files, according to particular needs. Such pages may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a webpage encompasses one or more corresponding webpage files (which a browser may use to render the webpage) and vice versa, where appropriate.

In particular embodiments, social-networking system 160 may be a network-addressable computing system that can host an online social network. Social-networking system 160 may generate, store, receive, and send social-networking data, such as, for example, user-profile data, concept-profile data, social-graph information, or other suitable data related to the online social network. Social-networking system 160 may be accessed by the other components of network environment 100 either directly or via network 110. In particular embodiments, social-networking system 160 may include one or more servers 162. Each server 162 may be a unitary server or a distributed server spanning multiple computers or multiple datacenters. Servers 162 may be of various types, such as, for example and without limitation, web server, news server, mail server, message server, advertising server, file server, application server, exchange server, database server, proxy server, another server suitable for performing functions or processes described herein, or any combination thereof. In particular embodiments, each server 162 may include hardware, software, or embedded logic components or a combination of two or more such components for carrying out the appropriate functionalities implemented or supported by server 162. In particular embodiments, social-networking system 164 may include one or more data stores 164. Data stores 164 may be used to store various types of information. In particular embodiments, the information stored in data stores 164 may be organized according to specific data structures. In particular embodiments, each data store 164 may be a relational, columnar, correlation, or other suitable database. Although this disclosure describes or illustrates particular types of databases, this disclosure contemplates any suitable types of databases. Particular embodiments may provide interfaces that enable a client system 130, a social-networking system 160, or a third-party system 170 to manage, retrieve, modify, add, or delete, the information stored in data store 164.

In particular embodiments, social-networking system 160 may store one or more social graphs in one or more data stores 164. In particular embodiments, a social graph may include multiple nodes—which may include multiple user nodes (each corresponding to a particular user) or multiple concept nodes (each corresponding to a particular concept)—and multiple edges connecting the nodes. Social-networking system 160 may provide users of the online social network the ability to communicate and interact with other users. In particular embodiments, users may join the online social network via social-networking system 160 and then add connections (e.g., relationships) to a number of other users of social-networking system 160 whom they want to be connected to. Herein, the term "friend" may refer to any other user of social-networking system 160 with whom a user has formed a connection, association, or relationship via social-networking system 160.

In particular embodiments, social-networking system 160 may provide users with the ability to take actions on various types of items or objects, supported by social-networking system 160. As an example and not by way of limitation, the items and objects may include groups or social networks to which users of social-networking system 160 may belong, events or calendar entries in which a user might be interested, computer-based applications that a user may use, transactions that allow users to buy or sell items via the service, interactions with advertisements that a user may perform, or other suitable items or objects. A user may interact with anything that is capable of being represented in social-networking system 160 or by an external system of third-party system 170, which is separate from social-networking system 160 and coupled to social-networking system 160 via a network 110.

In particular embodiments, social-networking system 160 may be capable of linking a variety of entities. As an example and not by way of limitation, social-networking system 160 may enable users to interact with each other as well as receive content from third-party systems 170 or other entities, or to allow users to interact with these entities through an application programming interfaces (API) or other communication channels.

In particular embodiments, a third-party system 170 may include one or more types of servers, one or more data stores, one or more interfaces, including but not limited to APIs, one or more web services, one or more content sources, one or more networks, or any other suitable components, e.g., that servers may communicate with. A third-party system 170 may be operated by a different entity from an entity operating social-networking system 160. In particular embodiments, however, social-networking system 160 and third-party systems 170 may operate in conjunction with each other to provide social-networking services to users of social-networking system 160 or third-party systems 170. In this sense, social-networking system 160 may provide a platform, or backbone, which other systems, such as third-party systems 170, may use to provide social-networking services and functionality to users across the Internet.

In particular embodiments, a third-party system 170 may include a third-party content object provider. A third-party content object provider may include one or more sources of content objects, which may be communicated to a client system 130. As an example and not by way of limitation, content objects may include information regarding things or activities of interest to the user, such as, for example, movie show times, movie reviews, restaurant reviews, restaurant menus, product information and reviews, or other suitable information. As another example and not by way of limitation, content objects may include incentive content objects, such as coupons, discount tickets, gift certificates, or other suitable incentive objects.

In particular embodiments, social-networking system 160 also includes user-generated content objects, which may enhance a user's interactions with social-networking system 160. User-generated content may include anything a user can add, upload, send, or "post" to social-networking system 160. As an example and not by way of limitation, a user communicates posts to social-networking system 160 from a client system 130. Posts may include data such as status updates or other textual data, location information, photos, videos, links, music or other similar data or media. Content may also be added to social-networking system 160 by a third-party through a "communication channel," such as a newsfeed or stream.

In particular embodiments, social-networking system 160 may include a variety of servers, sub-systems, programs, modules, logs, and data stores. In particular embodiments, social-networking system 160 may include one or more of the following: a web server, action logger, API-request server, relevance-and-ranking engine, content-object classifier, notification controller, action log, third-party-content-object-exposure log, inference module, authorization/privacy server, search module, advertisement-targeting module, user-interface module, user-profile store, connection store, third-party content store, or location store. Social-networking system 160 may also include suitable components such as network interfaces, security mechanisms, load balancers, failover servers, management-and-network-operations consoles, other suitable components, or any suitable combination thereof. In particular embodiments, social-networking system 160 may include one or more user-profile stores for storing user profiles. A user profile may include, for example, biographic information, demographic information, behavioral information, social information, or other types of descriptive information, such as work experience, educational history, hobbies or preferences, interests, affinities, or location. Interest information may include interests related to one or more categories. Categories may be general or specific. As an example and not by way of limitation, if a user "likes" an article about a brand of shoes the category may be the brand, or the general category of "shoes" or "clothing." A connection store may be used for storing connection information about users. The connection information may indicate users who have similar or common work experience, group memberships, hobbies, educational history, or are in any way related or share common attributes. The connection information may also include user-defined connections between different users and content (both internal and external). A web server may be used for linking social-networking system 160 to one or more client systems 130 or one or more third-party system 170 via network 110. The web server may include a mail server or other messaging functionality for receiving and routing messages between social-networking system 160 and one or more client systems 130. An API-request server may allow a third-party system 170 to access information from social-networking system 160 by calling one or more APIs. An action logger may be used to receive communications from a web server about a user's actions on or off social-networking system 160. In conjunction with the action log, a third-party-content-object log may be maintained of user exposures to third-party-content objects. A notification controller may provide information regarding content objects to a client system 130. Information may be pushed to a client system 130 as notifications, or information may be pulled from client system 130 responsive to a request received from client system 130. Authorization servers may be used to enforce one or more privacy settings of the users of social-networking system 160. A privacy setting of a user determines how particular information associated with a user can be shared. The authorization server may allow users to opt in to or opt out of having their actions logged by social-networking system 160 or shared with other systems (e.g., third-party system 170), such as, for example, by setting appropriate privacy settings. Third-party-content-object stores may be used to store content objects received from third parties, such as a third-party system 170. Location stores may be used for storing location information received from client systems 130 associated with users. Advertisement-pricing modules may combine social information, the current time, location information, or other suitable information to provide relevant advertisements, in the form of notifications, to a user.

Figure 2A:
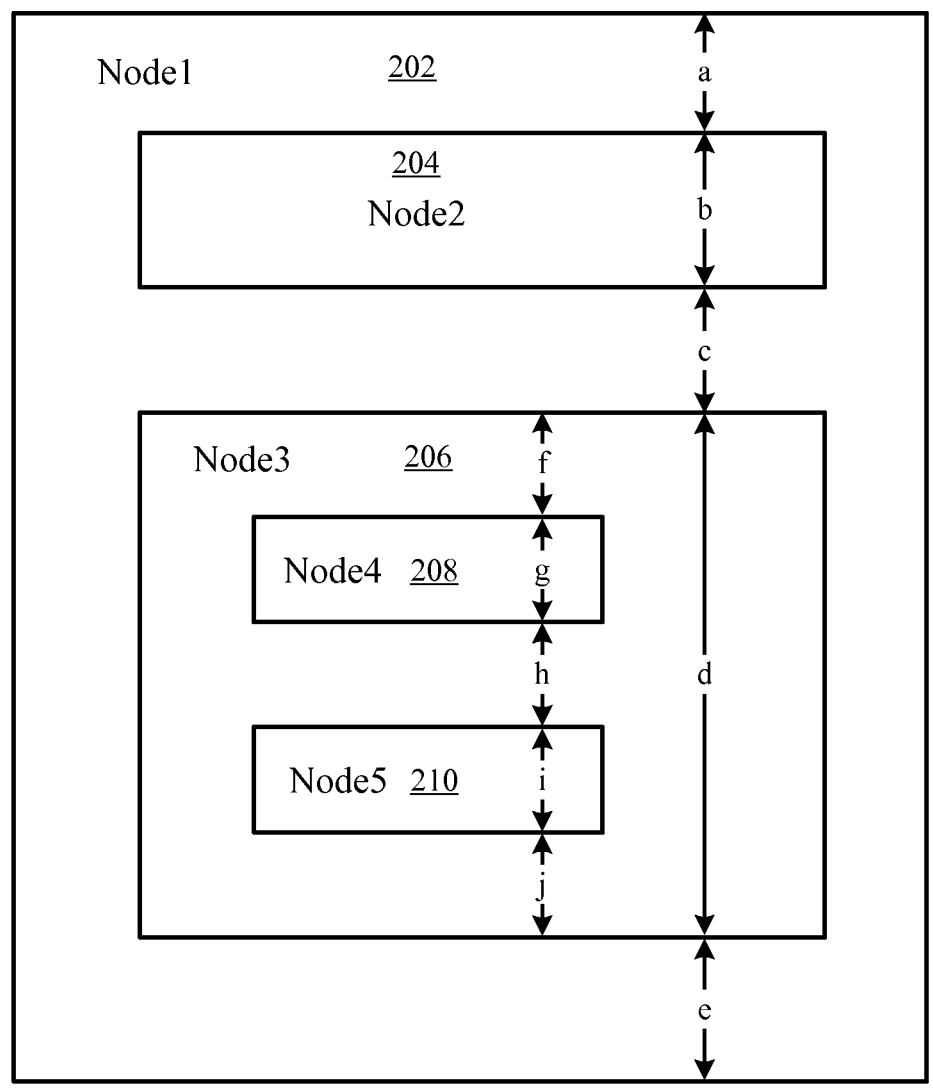
FIG. 2A illustrates an example user interface view tree size computation.

FIG. 2A illustrates an example user interface view tree size computation. A user interface view tree 200 includes nested nodes 202-210. The nodes may correspond to a hierarchy of user interface elements, such as panels, tables, and the like. The size of each view tree node is the sum of the size of the node itself and the sizes of the node's children, if any. For example, the size of Node1 202 is the size of the node itself, which is a+c+e, plus the size of child Node2 204, which is b, and the size of child Node3 206, which is d. The size of Node3 206, in turn, is the sum of the size of the node itself, which is f+h+j, the size of child Node4 208, and the size of child Node5 210. The size of a node that has child nodes, such as Node1 202, may be calculated using an application-defined size method that adds the size of the node (e.g., a+c+e) to the sizes of the node's children (e.g., b and d). The size method may calculate the sizes of the node's children using a recursive invocation that determines and returns the size of each child.

Figure 2B:
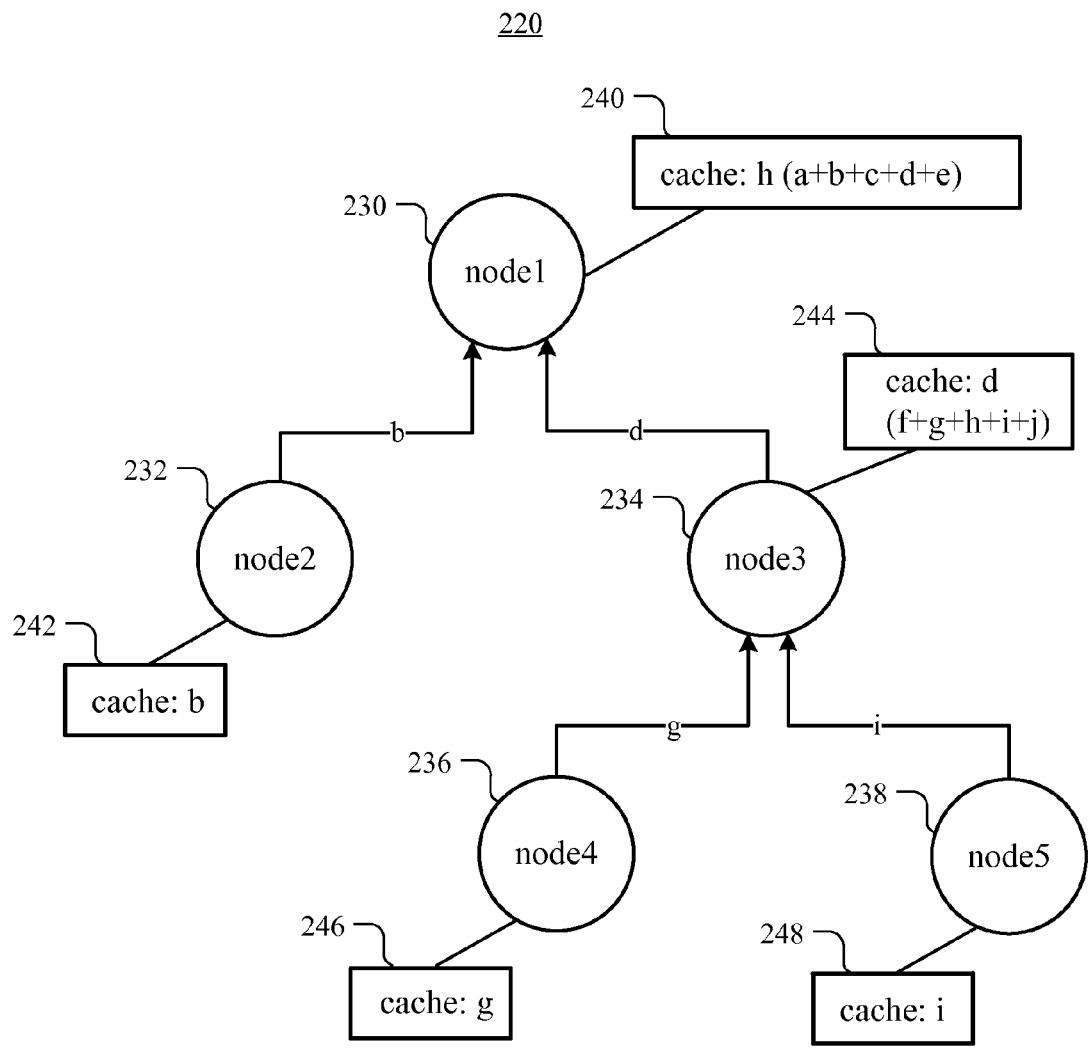
FIG. 2B illustrates an example view tree data structure.

FIG. 2B illustrates an example view tree data structure 220. The view tree 200 may be represented using a graph data structure 220. The graph 220 has graph nodes 230-238 representing the corresponding view tree nodes 202-210. The sizes of the view tree nodes 202-210 are computed, e.g., by a size method that traverses the graph, and may be stored in caches 240-248 associated with the corresponding graph nodes 230-238. The caches 240-248 may be memory locations at which the cached values are stored, and the memory locations may be associated with the corresponding graph nodes 230-238. Therefore, the memory location in which a view tree node's size is stored may be determined based on the associated graph node. A graph node node1 230 represents the view tree node Node1 202. When the size h of Node1 202 has been determined, e.g., by summing the sizes a+b+c+d+e, then the value of h is stored in the cache 240. The edges are labeled with the size values that child nodes determine and pass up to their parent nodes. For example, node2 232 determines the size b and passes it back to the parent node1 230.

In particular embodiments, the size of Node1 202 (h) may be computed by traversing the graph 220 and adding the size of each node to the size of the node's children. To compute the size of Node1 202, a size computation method may begin at node1 230 and determine the size of node1 itself, which is a+c+e. The size method may then determine the sizes of the child nodes Node2 and Node3 by invoking itself recursively for the child graph nodes node2 and node3. To determine the sizes of the nodes themselves, each invocation of the size method accesses node data stored in memory associated with the graph node and/or view tree node for which the size method is being invoked. The node data may include the size of the view tree node itself, e.g., a+c+e for Node1, b for Node2, and so on. The recursive invocation of the size method for node2 then returns the size of Node2, which is b, to the initial invocation. The initial invocation adds the result b to the size of node1. The size method then invokes itself recursively on node3 234 to determine the size of Node3. In this second recursive invocation, the size of Node3 itself is determined (d=f+h+j) and added to the sizes of Node4 and Node5, which are computed by recursively invoking the size method for node4 236 and node5 238, respectively. These recursive invocations return the sizes g and i, respectively, which are added by the size method invocation for node3 to the size of Node3 itself. The resulting size of Node3 is f+h++g+i. The size determined for each node may be cached in the cache memory location associated with the node, as described below.

The view tree size computation is an example of a computation that is requested by a framework or other generalized program code. The framework invokes an application-defined callback method, such as the size method described above, to perform application-specific processing on application-defined objects that are not part of the framework. The application-defined method is referred to herein as a callback method, since the framework "calls back" to the application to perform the callback method.

However, problems may occur because the application callback method may be executed in the framework's own user interface thread. In this case, application code that executes in the callback for more than a short period of time may stop the user interface's operations from executing until the application code returns control back to the framework, which ordinarily occurs when the application code has completed the operations it performs in the callback. The callback method may potentially execute for an indefinite amount of time, blocking the user interface's operations. The user interface thread may need to perform other computations, such as responding to user input and updating the user interface displayed on the computer system's display. Therefore, if the application code's operations are not completed within a short period of time, the system may become unresponsive or otherwise operate incorrectly.

This problem may be addressed by causing the callback program code to return control of execution to the application if the callback executes for more than a threshold period of time. In one example, the callback program code could be modified to check if the threshold period of time has elapsed, and return control to the invoking application if so. However, modifying the application's callback code in that way is burdensome and inconvenient for the application developer.

The techniques described herein may insert intermediary program code between the application and the framework to limit the execution time of application callback code. These changes are made transparently to the existing application and framework code, and no source code changes are needed. The intermediary program code may stop the application code at an intermediate step of its computation if a condition, such as a time limit, is met, and resume the computation in a subsequent invocation of the application code. For example, the application code may return an invalid value from the callback method when the computation is incomplete, and the framework may call the callback method repeatedly until the callback method completes its computation and returns a valid value. Each invocation of the callback may perform a portion of a computation and return control if the elapsed time since the callback's most recent invocation is greater than the threshold. Each portion of the computation performed by the callback method is referred to herein as a step. After a sufficient number of invocations, the computation finishes its computation and determines a result.

Figure 3:
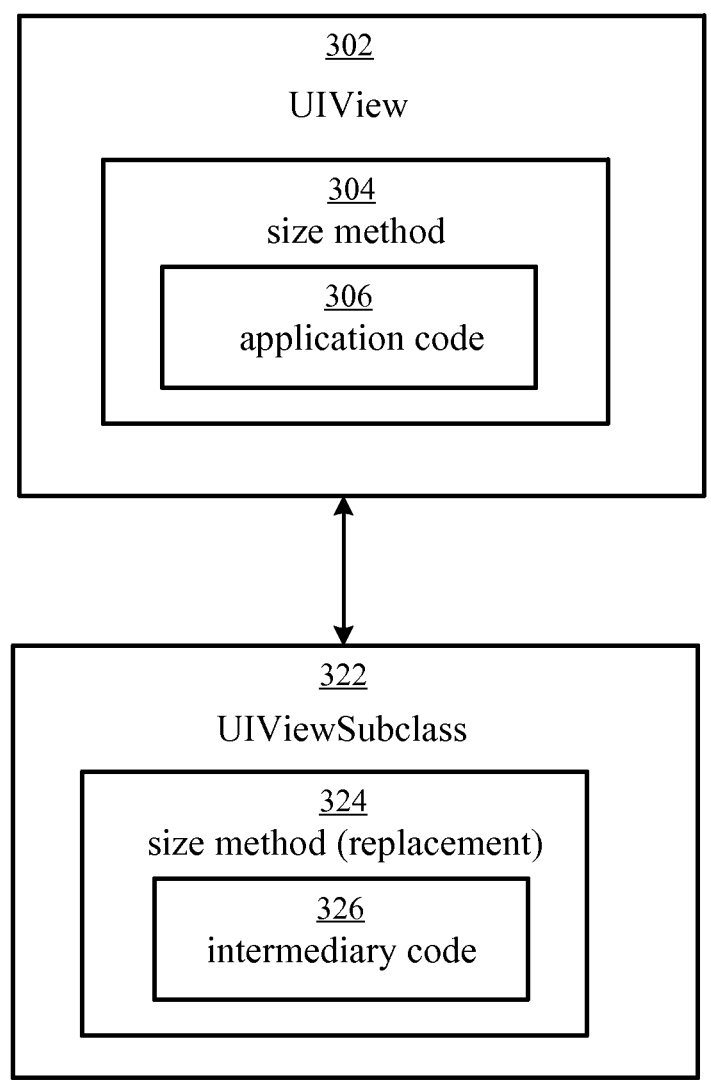
FIG. 3 illustrates an example of augmenting application program code with intermediary program code.

FIG. 3 illustrates an example of augmenting application program code with intermediary program code 326 that conditionally invokes an application method 304 to perform a computation. The application method 304 may be a callback method that, for example, computes the size of a user interface object. The application method 304 includes application program code 306 that performs a computation, such as computing the size. A replacement method 324 that includes the intermediary program code 326 may replace the application method 304, at least in the sense that invocations of the application size method 304 are replaced with invocations of the replacement size method 324 unless the application size method 304 is explicitly requested by the invocation. This method replacement may be performed using techniques such as runtime sub-classing, which is a feature of the Objective C programming language for replacing methods at runtime. Other suitable techniques for replacing methods at runtime may be used instead of runtime sub-classing. In other embodiments, the method replacement may be performed at other times, e.g., at compile time or link time.

In particular embodiments, to replace the application method 304 at runtime, a subclass 322 named UIViewSubclass is created. The subclass 322 is a subclass of a class 302 named UIView in which the application size method 304 is defined. A replacement size method 324 configured to execute the intermediary program code is created at runtime. The replacement method 324 may be added to the subclass at runtime as a replacement for the application size method 304 of the parent class 302. Subsequent invocations of the application method 304, e.g., by framework program code, may be replaced with invocations of the replacement method 324. In this way, the intermediary code 326 may be executed instead of the application code 306. The intermediary code 326 may invoke the application code 306, e.g., when sufficient resources are available to perform a computation.

Note that the term "application" as used herein refers to computer program code that may implement an application or other type of computer program that is invoked by other computer program code. The other computer program code is referred to herein as a "framework" for explanatory purposes. The terms "application" and "framework" are not meant to limit the application program code or methods or the framework program code or methods to having a particular type or structure.

Figure 4:
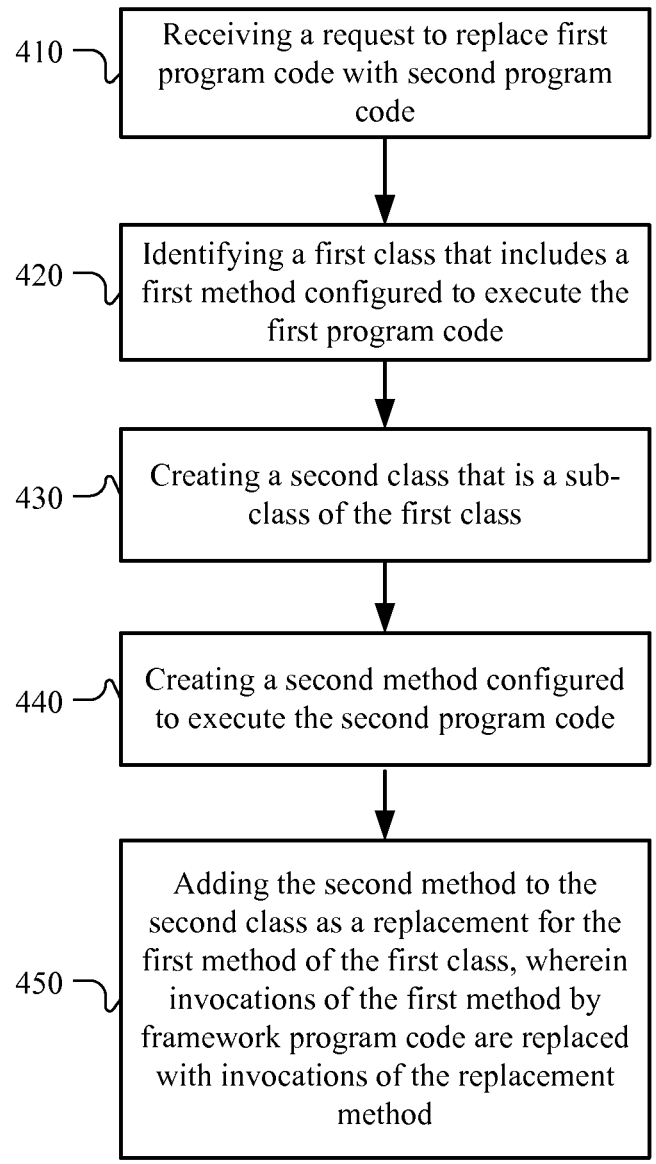
FIG. 4 illustrates an example method for replacing an application method using runtime sub-classing.

FIG. 4 illustrates an example method 400 for replacing an application method using runtime sub-classing. The method 400 augments the framework program code with an invocation of an intermediary method that in turn may invoke the application method. For example, program code that invokes the intermediary method is inserted into the framework code is inserted in the framework in place of program code that invokes the application method. This method replacement may be implemented by creating a subclass of the application method's class at runtime. The subclass defines the intermediary method, which ordinarily has the same name and signature as the application method. For example, an application's user interface code may define a callback method named sizeThatFits( ), which determines a size of a view tree. The sizeThatFits( ) method may be replaced with an intermediary method, also named sizeThatFits( ), that is defined in the subclass. In other embodiments, the intermediary method and the replaced application method may have different names. Invocations of the application's callback method by the framework subsequently call (e.g., invoke) the intermediary method instead of the application's method. The intermediary method may then call the application's method when a condition, such as an elapsed time being less than a time limit, is true.

The method 400 may begin at step 410, which receives a request to replace first program code with second program code. The first program code may correspond to an application-defined callback method, and the second program code may correspond to an intermediary callback method. The intermediary method may have the same name and signature as the application method, but with a program code implementation that performs the intermediary method illustrated in FIG. 5. At step 420, a first class that includes a first method configured to execute the first program code is identified. At step 430, a second class that is a sub-class of the first class is created. At step 440, a second method configured to execute the second program code is created. At step 450, the second method is added to the second class as a replacement for the first method of the first class. Subsequent invocations of the first method by framework program code are replaced with invocations of the replacement method.

As a result of the method of FIG. 4, invocations of the application method invoke the intermediary method unless the application method is explicitly specified in the invocation. The intermediary method may, for example, invoke the application method using an appropriate programming language feature, such as requesting that a superclass's method be invoked. As another example, the intermediary method may invoke the application method by storing a reference to the application method's class or to the application method itself, and using the reference to invoke the application method. Particular embodiments may repeat one or more steps of the method of FIG. 4, where appropriate. Although this disclosure describes and illustrates particular steps of the method of FIG. 4 as occurring in a particular order, this disclosure contemplates any suitable steps of the method of FIG. 4 occurring in any suitable order. Moreover, although this disclosure describes and illustrates an example method for replacing an application method including the particular steps of the method of FIG. 4, this disclosure contemplates any suitable method for replacing an application method including any suitable steps, which may include all, some, or none of the steps of the method of FIG. 4, where appropriate. Furthermore, although this disclosure describes and illustrates particular components, devices, or systems carrying out particular steps of the method of FIG. 4, this disclosure contemplates any suitable combination of any suitable components, devices, or systems carrying out any suitable steps of the method of FIG. 4.

Figure 5:
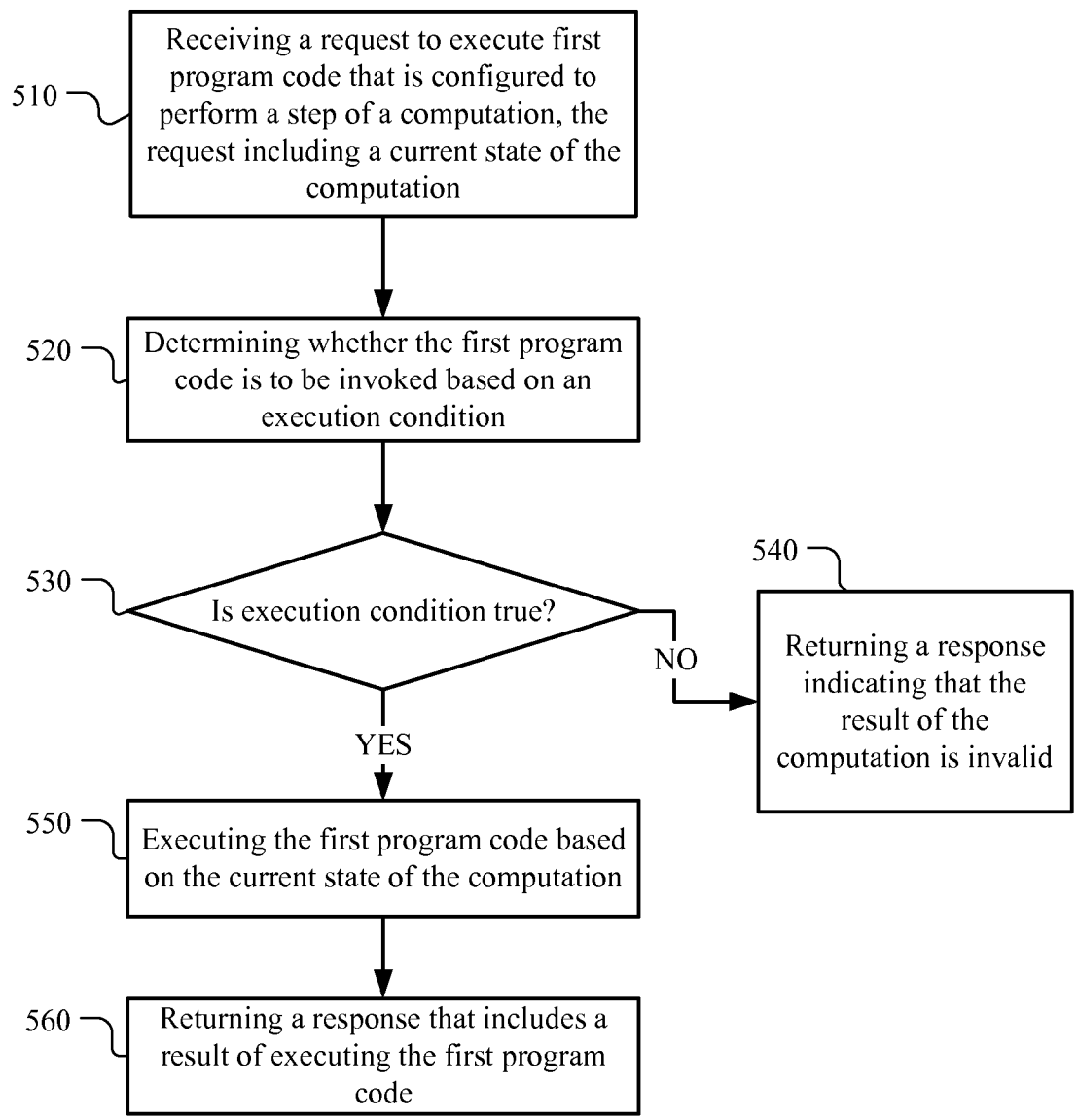
FIG. 5 illustrates an example intermediary method for conditionally invoking an application method.

FIG. 5 illustrates an example intermediary method 500 for conditionally invoking an application method. The method may begin at step 510, where a request to execute first program code is received. The first program code is configured to perform a step of a computation, and the request includes a current state of the computation. At step 520, the method determines whether the first program code is to be invoked based on an execution condition. At step 530, the method transfers control to step 540 when the execution condition is false, or transfers control to step 550 when the execution condition is true. Step 540 returns a response indicating that the result of the computation is invalid, at which point the method 500 ends. If the execution condition is true, step 550 executes the first program code based on the current state of the computation, e.g., based on input data or other data received at or accessed by the current step of the computation. Step 560 returns a response that includes a result of executing the first program code. The result returned is ordinarily a result received from the program code that was executed at step 550.

Particular embodiments may repeat one or more steps of the method of FIG. 5, where appropriate. Although this disclosure describes and illustrates particular steps of the method of FIG. 5 as occurring in a particular order, this disclosure contemplates any suitable steps of the method of FIG. 5 occurring in any suitable order. Moreover, although this disclosure describes and illustrates an example method for replacing and conditionally invoking an application method including the particular steps of the method of FIG. 5, this disclosure contemplates any suitable method for replacing and conditionally invoking an application method including any suitable steps, which may include all, some, or none of the steps of the method of FIG. 5, where appropriate. Furthermore, although this disclosure describes and illustrates particular components, devices, or systems carrying out particular steps of the method of FIG. 5, this disclosure contemplates any suitable combination of any suitable components, devices, or systems carrying out any suitable steps of the method of FIG. 5.

Figure 6A:
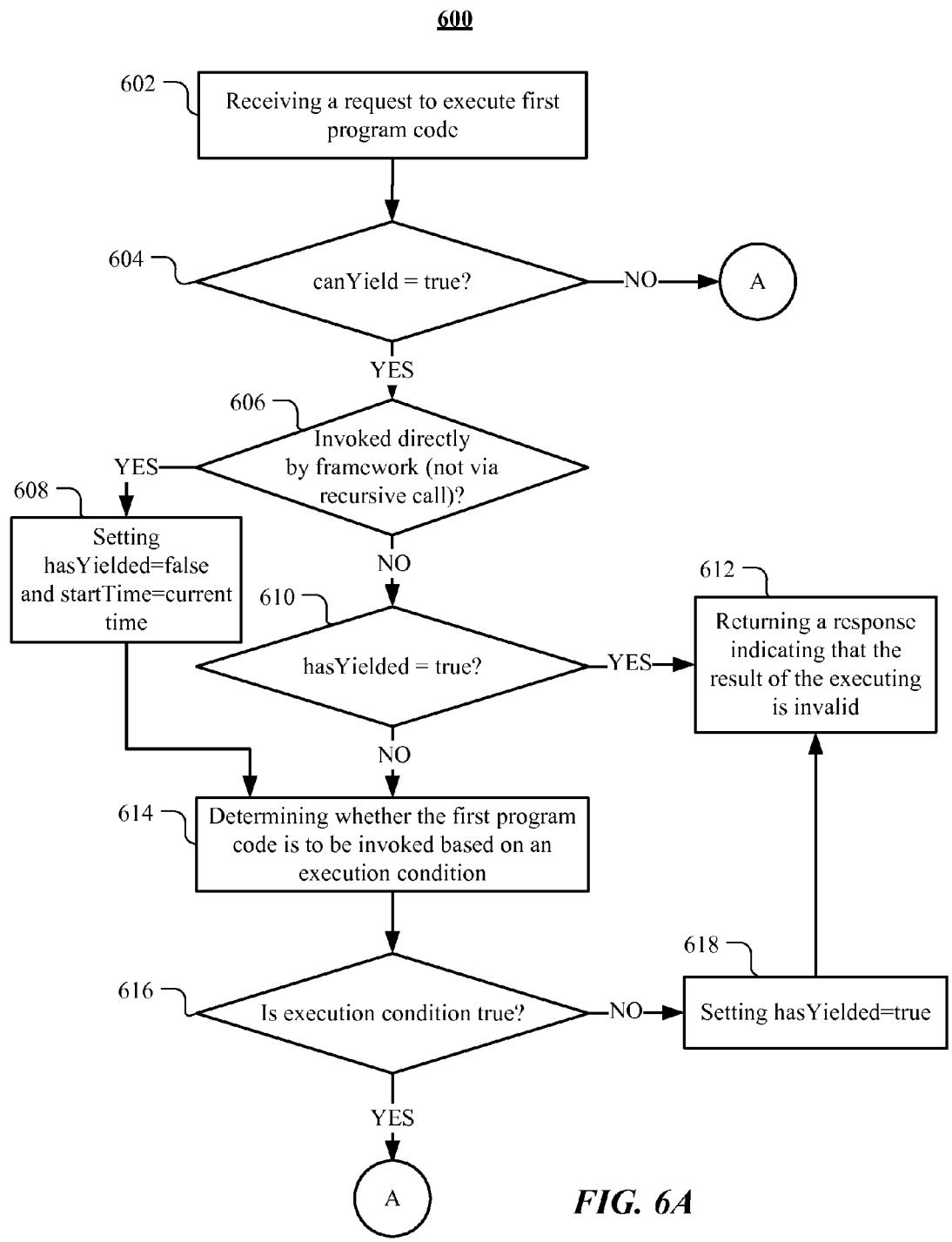
FIGS. 6A and 6B illustrate in further detail an example intermediary method for conditionally invoking an application method.
Figure 6B:
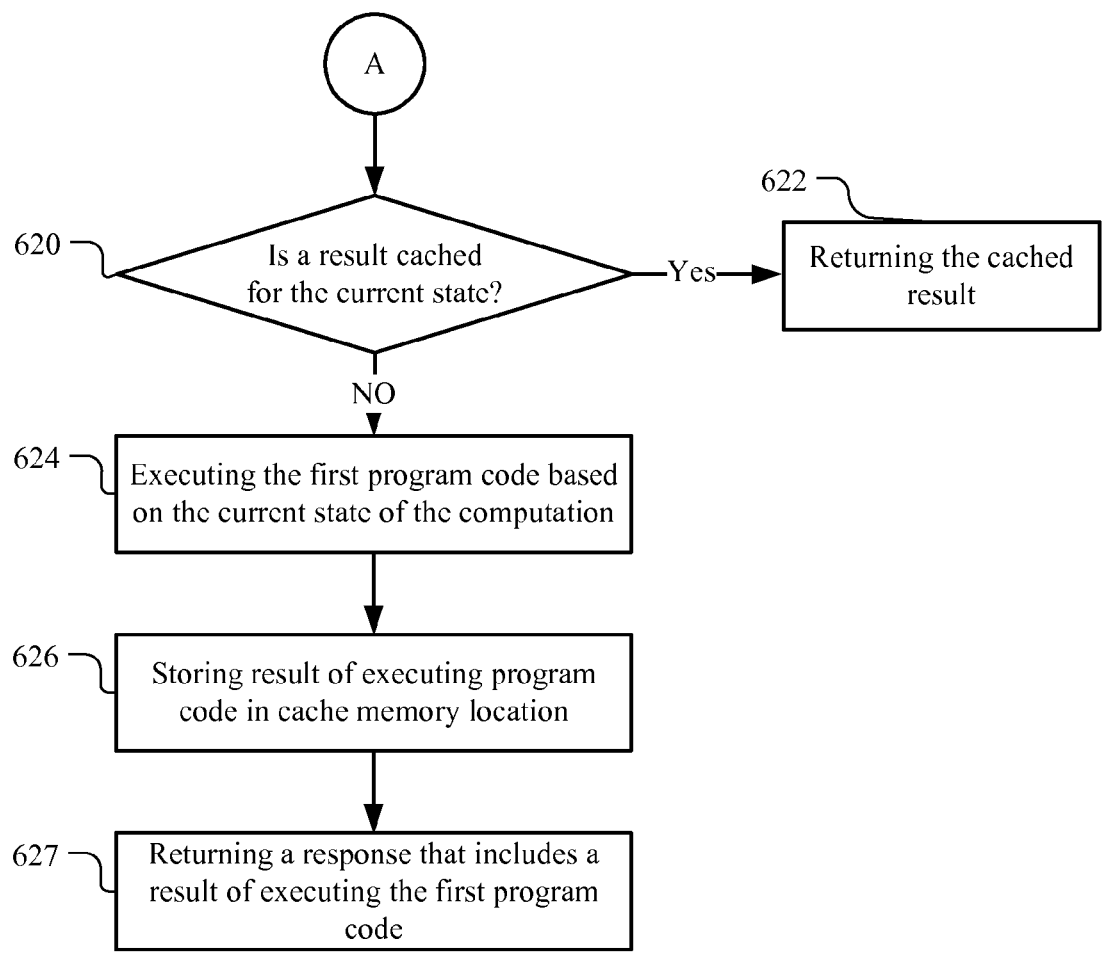

FIGS. 6A and 6B illustrate in further detail an example intermediary method 600 for conditionally invoking an application method. The method may begin at step 602, where a request to execute first program code is received along with a current computation state, such as an input value. The computation state or input value may be associated with a current step of a computation implemented by the first program code. The computation state may be a graph node currently being processed, a number being added to a result, and so on. The state or input value may be received as a parameter or read from memory accessible to the intermediary method 600.

At step 604 the intermediary method 600 begins checking conditions to determine whether to invoke the application method to perform at least a portion of the computation. Step 604 determines whether yielding is enabled, e.g., as a configuration option, by checking whether a variable named canYield is true. If not, then yielding is disabled, and the application method may be executed unconditionally, e.g., to completion. Caching may still be performed if yielding is disabled, so step 604 transfers control to step 620 of FIG. 6B (via transfer point A) to check for cached results when yielding is disabled and invoke the application method without checking the execution condition. In other embodiments, caching may be enabled or disabled based on a variable such as canCache (not shown).

If step 604 determines that yielding is enabled, then step 606 determines whether the intermediary method 600 is being invoked directly by the framework, as opposed to being invoked recursively, as may occur during a computation. If step 606 determines that the method 600 is being invoked directly by the framework, then the method 600 is beginning a new computation on behalf of the framework, and may begin counting resource usage at zero usage. Step 608 sets a variable named hasYielded to false, to indicate that the current computation has not yielded since being invoked by the framework. Any resource counters, such as timers, that are used in the execution condition, may be reset to zero at step 608. For example, if elapsed time is being measured since a start time, the start time may be set to the current time at step 608. Step 608 transfers control to step 614 to determine whether to invoke the application method, as described below. Returning to step 606, if the invocation of the method 600 is a recursive call or otherwise not directly from external program code such as a framework, then the method continues at step 610, which determines whether the hasYielded variable is true. If so, the execution condition became false in a previous invocation of the method 600 (e.g., a different call in a recursive traversal of a tree hierarchy), and the computation was stopped at step 616. Since the computation was stopped before running to completion, any result value is likely incorrect (e.g., an intermediate result), so an error indicating that the result is invalid is returned by the method 600. Step 612 returns an error or an undefined result to indicate that the result is invalid.

At step 614, the method determines whether the first program code, e.g., the application method, is to be invoked based on an execution condition. The execution condition may be time-based. For example, the condition may be that an amount of time that has elapsed since a start time, such as that set in step 608, is less than a time limit. The time limit may be a value in units such as milliseconds or other units. The value of the time limit may be determined empirically, e.g., by running test scenarios to determine how much time delay can be tolerated in the application size callback while maintaining proper user interface operation. The time limit may then be set based on this tolerance, which may be scaled by a factor based on processor speed. In other embodiments, the execution condition may be based on factors other than time. Availability of other finite resources, such as memory or network bandwidth, may also be used as criteria for determining whether to invoke the application method.

In one example, the execution condition is "elapsedTime<timeLimit", where elapsedTime is a measure of time since the beginning of a computation, e.g., since step 608 was executed, and timeLimit is the maximum time for which the computation should execute, as described above. If step 614 determines that the execution condition is false, then step 616 transfers control to step 618. At step 618, the hasYielded variable is set to true to indicate that the computation has been stopped before completion, and any result values are likely incorrect. Step 612 then returns a response indicating that the result is invalid.

If step 614 determines that the execution condition is true, then step 616 transfers control to step 620 of FIG. 6B (via transfer point A). At step 620, the method determines whether a result is cached for the current state. If so, the cached result is returned as the result of the application method at step 622, and the method ends. If there is no cached result at step 620, then the first program code (e.g., the application method) is executed at step 624. The current state is provided to the first program code as input or otherwise made accessible, e.g., via a data structure accessible in memory. When the first program code returns, step 626 stores the result of the first program code in a cache memory location associated with the current state. Step 627 then returns a response that includes the result.

Particular embodiments may repeat one or more steps of the method of FIGS. 6A and 6B, where appropriate. Although this disclosure describes and illustrates particular steps of the method of FIGS. 6A and 6B as occurring in a particular order, this disclosure contemplates any suitable steps of the method of FIGS. 6A and 6B occurring in any suitable order. Moreover, although this disclosure describes and illustrates an example method for conditionally invoking an application method including the particular steps of the method of FIGS. 6A and 6B, this disclosure contemplates any suitable method for conditionally invoking an application method including any suitable steps, which may include all, some, or none of the steps of the method of FIGS. 6A and 6B, where appropriate. Furthermore, although this disclosure describes and illustrates particular components, devices, or systems carrying out particular steps of the method of FIGS. 6A and 6B, this disclosure contemplates any suitable combination of any suitable components, devices, or systems carrying out any suitable steps of the method of FIGS. 6A and 6B.

Figure 7:
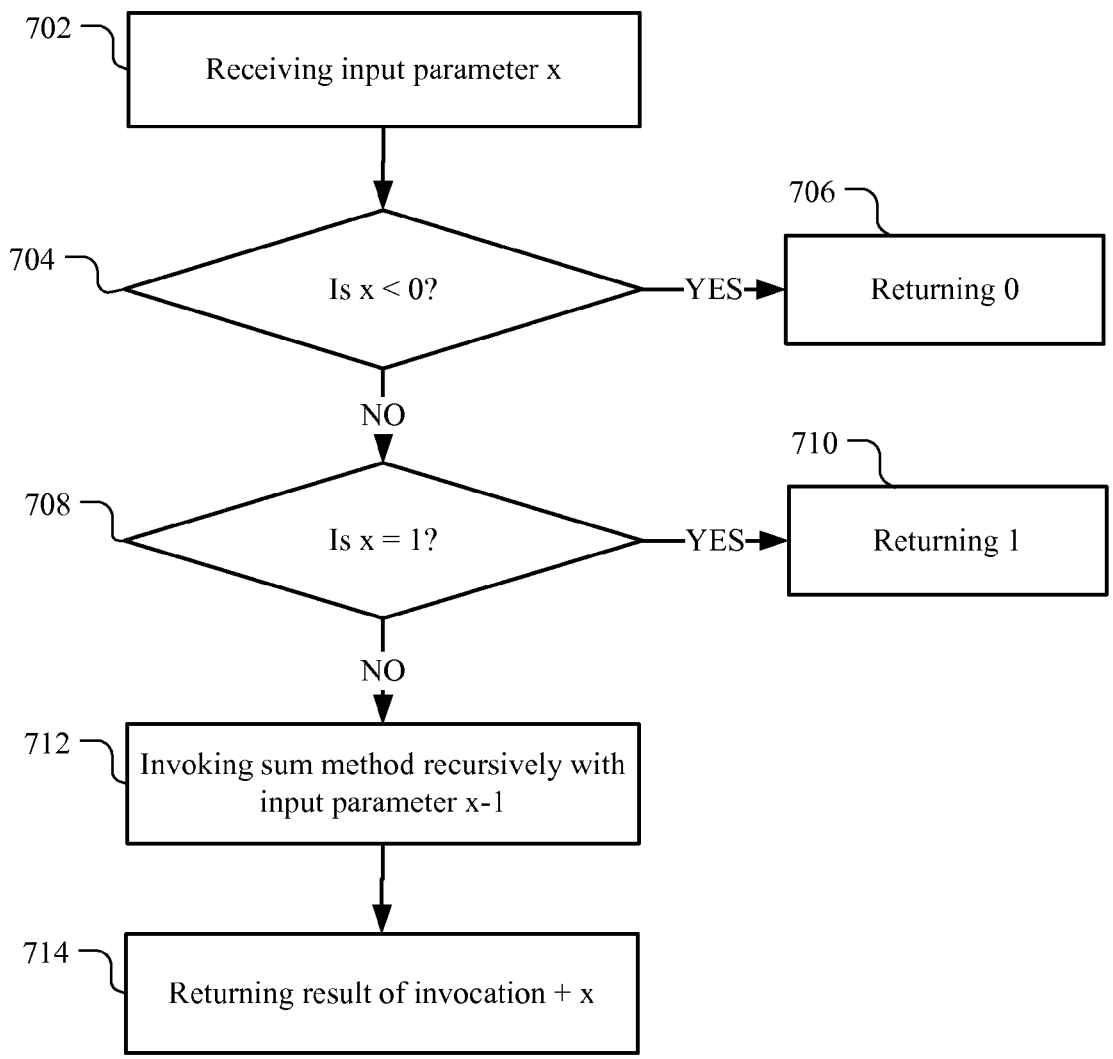
FIG. 7 illustrates an example application method for computing a sum of input values.

FIG. 7 illustrates an example application method 700 for computing a sum of input values. The method begins at step 702, which receives an input value x, e.g., as a parameter. Step 704 determines whether x is less than 0. If so, step 706 returns 0, and the invocation of the method 700 ends. Otherwise, step 708 determines whether x is 1. If so, step 710 returns 1, and the invocation ends. At step 712, x is greater than 1, so the method 700 invokes the sum method recursively with x−1 as the input parameter. In this way, the sum method is invoked for each positive integer, and returns the result of adding x to each integer less than x and greater than 0.

The recursive sum operation performed by the method 700 may take a relatively long period of time for large values of x. If, at any of the recursive invocations, an execution condition, such as a time constraint, is not met, then the intermediary method caches the current intermediate result (i.e., intermediate sum), and returns control to the invoker of the sum method with an invalid result (instead of invoking the sum method again). The invoker of the sum method may repeat the invocation (which actually invokes the intermediary method, which in turn invokes the sum callback method) multiple times until a valid result is returned. The repeated invocations may continue after the point in the computation that determined the cached intermediate result rather than starting from 0. Each of the repeated invocations is likely to make progress towards the result, so the sum operations should eventually arrive at a result, at which point the repeated invocations stop because the sum method returns a valid result.

Figure 8:
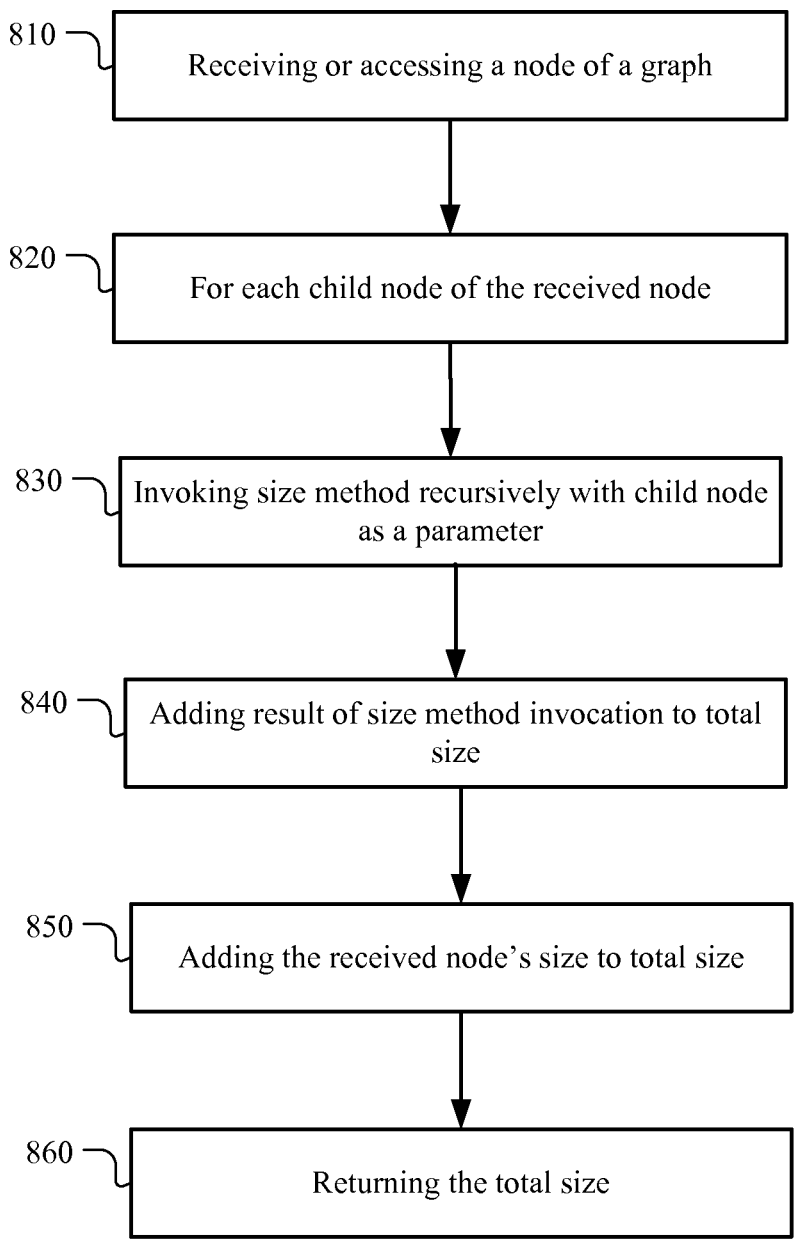
FIG. 8 illustrates an example application method for computing a size of a view tree.

FIG. 8 illustrates an example application method 800 for computing a size of a view tree. The method 800 may be performed by an application callback method when a user interface framework requests the size or height of a view tree. At step 810, the size callback method receives or accesses a node for which the size is to be computed. Step 810 may also initialize a total size value to the size of the received node. The total size value stores the intermediate result while the computation is in progress. Step 820 invokes step 830 for each child node of the received node, if any. Step 830 invokes the method 800 recursively, passing the child node as a parameter or otherwise making the child node accessible to the invoked method 800. Step 840 is executed when the recursive invocation at step 830 returns. At step 850, the result of the recursive method invocation is added to the total size. At step 860, the total size is returned as a result of the application method 800.

Figure 9:
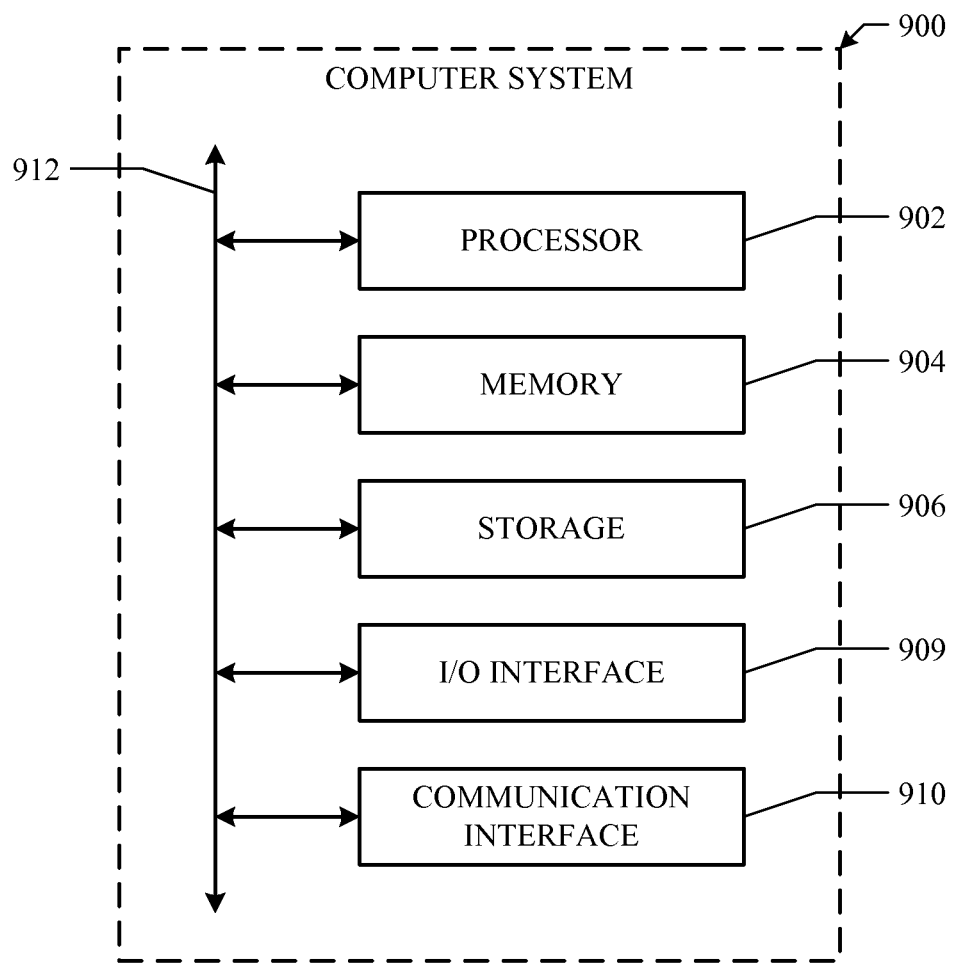
FIG. 9 illustrates an example computer system.

FIG. 9 illustrates an example computer system 900. In particular embodiments, one or more computer systems 900 perform one or more steps of one or more methods described or illustrated herein. In particular embodiments, one or more computer systems 900 provide functionality described or illustrated herein. In particular embodiments, software running on one or more computer systems 900 performs one or more steps of one or more methods described or illustrated herein or provides functionality described or illustrated herein. Particular embodiments include one or more portions of one or more computer systems 900. Herein, reference to a computer system may encompass a computing device, and vice versa, where appropriate. Moreover, reference to a computer system may encompass one or more computer systems, where appropriate.

This disclosure contemplates any suitable number of computer systems 900. This disclosure contemplates computer system 900 taking any suitable physical form. As example and not by way of limitation, computer system 900 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, or a combination of two or more of these. Where appropriate, computer system 900 may include one or more computer systems 900; be unitary or distributed; span multiple locations; span multiple machines; span multiple data centers; or reside in a cloud, which may include one or more cloud components in one or more networks. Where appropriate, one or more computer systems 900 may perform without substantial spatial or temporal limitation one or more steps of one or more methods described or illustrated herein. As an example and not by way of limitation, one or more computer systems 900 may perform in real time or in batch mode one or more steps of one or more methods described or illustrated herein. One or more computer systems 900 may perform at different times or at different locations one or more steps of one or more methods described or illustrated herein, where appropriate.

In particular embodiments, computer system 900 includes a processor 902, memory 904, storage 906, an input/output (I/O) interface 908, a communication interface 910, and a bus 912. Although this disclosure describes and illustrates a particular computer system having a particular number of particular components in a particular arrangement, this disclosure contemplates any suitable computer system having any suitable number of any suitable components in any suitable arrangement.

In particular embodiments, processor 902 includes hardware for executing instructions, such as those making up a computer program. As an example and not by way of limitation, to execute instructions, processor 902 may retrieve (or fetch) the instructions from an internal register, an internal cache, memory 904, or storage 906; decode and execute them; and then write one or more results to an internal register, an internal cache, memory 904, or storage 906. In particular embodiments, processor 902 may include one or more internal caches for data, instructions, or addresses. This disclosure contemplates processor 902 including any suitable number of any suitable internal caches, where appropriate. As an example and not by way of limitation, processor 902 may include one or more instruction caches, one or more data caches, and one or more translation lookaside buffers (TLBs). Instructions in the instruction caches may be copies of instructions in memory 904 or storage 906, and the instruction caches may speed up retrieval of those instructions by processor 902. Data in the data caches may be copies of data in memory 904 or storage 906 for instructions executing at processor 902 to operate on; the results of previous instructions executed at processor 902 for access by subsequent instructions executing at processor 902 or for writing to memory 904 or storage 906; or other suitable data. The data caches may speed up read or write operations by processor 902. The TLBs may speed up virtual-address translation for processor 902. In particular embodiments, processor 902 may include one or more internal registers for data, instructions, or addresses. This disclosure contemplates processor 902 including any suitable number of any suitable internal registers, where appropriate. Where appropriate, processor 902 may include one or more arithmetic logic units (ALUs); be a multi-core processor; or include one or more processors 902. Although this disclosure describes and illustrates a particular processor, this disclosure contemplates any suitable processor.

In particular embodiments, memory 904 includes main memory for storing instructions for processor 902 to execute or data for processor 902 to operate on. As an example and not by way of limitation, computer system 900 may load instructions from storage 906 or another source (such as, for example, another computer system 900) to memory 904. Processor 902 may then load the instructions from memory 904 to an internal register or internal cache. To execute the instructions, processor 902 may retrieve the instructions from the internal register or internal cache and decode them. During or after execution of the instructions, processor 902 may write one or more results (which may be intermediate or final results) to the internal register or internal cache. Processor 902 may then write one or more of those results to memory 904. In particular embodiments, processor 902 executes only instructions in one or more internal registers or internal caches or in memory 904 (as opposed to storage 906 or elsewhere) and operates only on data in one or more internal registers or internal caches or in memory 904 (as opposed to storage 906 or elsewhere). One or more memory buses (which may each include an address bus and a data bus) may couple processor 902 to memory 904. Bus 912 may include one or more memory buses, as described below. In particular embodiments, one or more memory management units (MMUs) reside between processor 902 and memory 904 and facilitate accesses to memory 904 requested by processor 902. In particular embodiments, memory 904 includes random access memory (RAM). This RAM may be volatile memory, where appropriate Where appropriate, this RAM may be dynamic RAM (DRAM) or static RAM (SRAM). Moreover, where appropriate, this RAM may be single-ported or multi-ported RAM. This disclosure contemplates any suitable RAM. Memory 904 may include one or more memories 904, where appropriate. Although this disclosure describes and illustrates particular memory, this disclosure contemplates any suitable memory.

In particular embodiments, storage 906 includes mass storage for data or instructions. As an example and not by way of limitation, storage 906 may include a hard disk drive (HDD), a floppy disk drive, flash memory, an optical disc, a magneto-optical disc, magnetic tape, or a Universal Serial Bus (USB) drive or a combination of two or more of these. Storage 906 may include removable or non-removable (or fixed) media, where appropriate. Storage 906 may be internal or external to computer system 900, where appropriate. In particular embodiments, storage 906 is non-volatile, solid-state memory. In particular embodiments, storage 906 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 906 taking any suitable physical form. Storage 906 may include one or more storage control units facilitating communication between processor 902 and storage 906, where appropriate. Where appropriate, storage 906 may include one or more storages 906. Although this disclosure describes and illustrates particular storage, this disclosure contemplates any suitable storage.

In particular embodiments, I/O interface 908 includes hardware, software, or both, providing one or more interfaces for communication between computer system 900 and one or more I/O devices. Computer system 900 may include one or more of these I/O devices, where appropriate. One or more of these I/O devices may enable communication between a person and computer system 900. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 908 for them. Where appropriate, I/O interface 908 may include one or more device or software drivers enabling processor 902 to drive one or more of these I/O devices. I/O interface 908 may include one or more I/O interfaces 908, where appropriate. Although this disclosure describes and illustrates a particular I/O interface, this disclosure contemplates any suitable I/O interface.

In particular embodiments, communication interface 910 includes hardware, software, or both providing one or more interfaces for communication (such as, for example, packet-based communication) between computer system 900 and one or more other computer systems 900 or one or more networks. As an example and not by way of limitation, communication interface 910 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 910 for it. As an example and not by way of limitation, computer system 900 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 900 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 900 may include any suitable communication interface 910 for any of these networks, where appropriate. Communication interface 910 may include one or more communication interfaces 910, where appropriate. Although this disclosure describes and illustrates a particular communication interface, this disclosure contemplates any suitable communication interface.

In particular embodiments, bus 912 includes hardware, software, or both coupling components of computer system 900 to each other. As an example and not by way of limitation, bus 912 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 912 may include one or more buses 912, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A method comprising:
by a computer system, replacing an application method with an intermediary method, wherein the application method comprises application program code configured to perform one or more steps of a computation, the intermediary method comprises intermediary program code configured to invoke the application program code based on an execution condition being satisfied, wherein the replacing causes recursive invocations of the application method by the application program code to execute the intermediary method;
by the computer system, receiving an invocation of the application method, wherein the invocation includes input data for the computation;
by the computer system, when the invocation is received, executing the intermediary program code, wherein the executing the intermediary program code comprises:
by the computer system, determining, based on the execution condition, that the application program code is to be invoked to perform the steps of the computation;
by the computer system, when the application program code is to be invoked, executing the application program code based on the input data, wherein the executing the application program code comprises:
by the computer system, performing one or more of the steps of the computation based on the input data, and
by the computer system, invoking the application method recursively to attempt to perform another step of the one or more steps of the computation based on the input data;
wherein the invoking the application method recursively causes another execution of the intermediary program code; and
by the computer system, returning a response that includes a result of the computation; and
by the computer system, when the application program code is not to be invoked, returning a response indicating an invalid result.

2. The method of claim 1, wherein the replacing causes execution of the application program code to be limited by the execution condition without modifying the application program code.

3. The method of claim 1, wherein the executing the application program code is further based on a current state of the computation, and the current state of the computation comprises an element of a data structure generated by the computation.

4. The method of claim 3, wherein the element of the data structure comprises a node of a graph generated by the computation.

5. The method of claim 1, wherein the execution condition is false when an amount of time that has passed since a previous execution of the application program code is greater than a threshold time limit.

6. The method of claim 3, further comprising: determining a cache memory location based on the current state of the computation; and storing the result generated by the application program code in the cache memory location.

7. The method of claim 6, further comprising: determining whether a computation result associated with the current state of the computation is present in the cache memory location, wherein the execution condition is false when the computation result is present in the cache memory location; and returning the computation result from the cache memory location as the response from the application program code when the computation result is present in the cache memory location.

8. The method of claim 1, wherein the invocation of the application method is received from framework program code that is distinct from the application program code and the intermediary program code.

9. The method of claim 1, wherein the replacing the application method with the intermediary method is performed at runtime.

10. The method of claim 1, wherein the replacing the application method with the intermediary method comprises:
by the computer system, identifying an application class that includes the application method;
by the computer system, creating an intermediary class that is a sub-class of the application class;
by the computer system, creating the intermediary method; and
by the computer system, adding the intermediary method to the intermediary class as a replacement for the application method of the application class, wherein each invocation of the application method by framework program code invokes the intermediary method.

11. The method of claim 1, wherein the application program code corresponds to an application-defined callback method, and the intermediary program code corresponds to an intermediary callback method.

12. The method of claim 3, wherein the application program code is configured to perform a method comprising:
by the computer system, accessing a current graph node of a graph data structure, wherein the current graph node is associated with the current state;
by the computer system, identifying at least one child node of the current graph node; wherein the input data for each execution of the application program code comprises the current graph node, wherein the current graph node is provided as input to each execution of the intermediary program code.

13. One or more computer-readable non-transitory storage media embodying software that is operable when executed to:
replace an application method with an intermediary method, wherein the application method comprises application program code configured to perform one or more steps of a computation, the intermediary method comprises intermediary program code configured to invoke the application program code based on an execution condition being satisfied, wherein the replacing causes recursive invocations of the application method by the application program code to execute the intermediary method;
receive an invocation of request the application method, wherein the invocation includes input data for the computation;
when the invocation is received, execute the intermediary program code, wherein the executing the intermediary program code comprises:
determining, based on the execution condition, that the application program code is to be invoked to perform the steps of the computation;
when the application program code is to be invoked, execute the application program code based on the input data, wherein the executing the application program code comprises:
performing one or more of the steps of the computation based on the input data, and
invoking the application method recursively to attempt to perform another step of the one or more steps of the computation based on the input data;
wherein the invoking the application method recursively causes another execution of the intermediary program code; and
returning a response that includes a result of the computation; and
when the application program code is not to be invoked, return a response indicating an invalid result.

14. The storage media of claim 13, wherein the replacing causes execution of the application program code to be limited by the execution condition without modifying the application program code.

15. The storage media of claim 13, wherein the execution condition is false when an amount of time that has passed since a previous execution of the application program code is greater than a threshold time limit.

16. The storage media of claim 14, wherein the invocation of the application method is received from framework program code that is distinct from the application program code and the intermediary program code.

17. A system comprising:
one or more processors; and
a memory coupled to the processors comprising instructions executable by the processors, the processors being operable when executing the instructions to:
replace an application method with an intermediary method, wherein the application method comprises application program code configured to perform one or more steps of a computation, the intermediary method comprises intermediary program code configured to invoke the application program code based on an execution condition being satisfied, wherein the replacing causes recursive invocations of the application method by the application program code to execute the intermediary method;
receive an invocation of request the application method, wherein the invocation includes input data for the computation;
when the invocation is received, execute the intermediary program code, wherein the executing the intermediary program code comprises:
determining, based on the execution condition, that the application program code is to be invoked to perform the steps of the computation;
when the application program code is to be invoked, execute the application program code based on the input data, wherein the executing the application program code comprises:
performing one or more of the steps of the computation based on the input data, and
invoking the application method recursively to attempt to perform another step of the one or more steps of the computation based on the input data;
wherein the invoking the application method recursively causes another execution of the intermediary program code; and
returning a response that includes a result of the computation; and
when the application program code is not to be invoked, return a response indicating an invalid result.

18. The system of claim 17, wherein the replacing causes execution of the application program code to be limited by the execution condition without modifying the application program code.

19. The system of claim 17, wherein the execution condition is false when an amount of time that has passed since a previous execution of the application program code is greater than a threshold time limit.

* * * * *